United States Patent
Woerz et al.

(10) Patent No.: US 12,151,657 B2
(45) Date of Patent: Nov. 26, 2024

(54) SERVICE BRAKE APPLICATION UTILIZING A MULTI-CIRCUIT HYDRAULIC-POWER VEHICLE BRAKE SYSTEM

(71) Applicant: Robert Bosch GmbH, Stuttgart (DE)

(72) Inventors: Christian Woerz, Beilstein (DE); Dirk Foerch, Neuenstadt/Stein (DE); Herbert Vollert, Vaihingen/Enz (DE); Jens Wagner, Untergruppenbach (DE); Matthias Kistner, Bretzfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 261 days.

(21) Appl. No.: 17/446,243

(22) Filed: Aug. 27, 2021

(65) Prior Publication Data

US 2022/0097666 A1 Mar. 31, 2022

(30) Foreign Application Priority Data

Sep. 30, 2020 (DE) .......................... 102020212413.2

(51) Int. Cl.
| | | |
|---|---|---|
| B60T 13/68 | (2006.01) | |
| B60L 7/24 | (2006.01) | |
| B60T 13/16 | (2006.01) | |
| B60T 13/58 | (2006.01) | |
| B60T 13/62 | (2006.01) | |

(52) U.S. Cl.
CPC .............. *B60T 13/686* (2013.01); *B60L 7/24* (2013.01); *B60T 13/161* (2013.01); *B60T 13/586* (2013.01); *B60T 13/62* (2013.01); *B60T 2270/402* (2013.01); *B60T 2270/604* (2013.01)

(58) Field of Classification Search
CPC .... B60T 13/686; B60T 13/161; B60T 13/586; B60T 13/62; B60T 2270/402; B60T 2270/604; B60L 7/24
See application file for complete search history.

(56) References Cited

U.S. PATENT DOCUMENTS

| | | | |
|---|---|---|---|
| 2007/0013230 A1* | 1/2007 | Yang .......................... | B60L 7/26 303/155 |
| 2008/0116743 A1* | 5/2008 | Jeon .......................... | B60L 3/10 303/152 |
| 2013/0214587 A1* | 8/2013 | Yang ..................... | B60T 8/4081 303/6.01 |
| 2015/0314686 A1* | 11/2015 | Knechtges ................ | B60T 1/10 303/3 |
| 2016/0152223 A1* | 6/2016 | Bauer ..................... | B60T 7/042 303/14 |

(Continued)

FOREIGN PATENT DOCUMENTS

| | | | | |
|---|---|---|---|---|
| DE | 102017214858 A1 | * | 2/2019 | ............ B60T 13/146 |
| WO | 2012150120 A1 | | 11/2012 | |

*Primary Examiner* — Pamela Rodriguez
(74) *Attorney, Agent, or Firm* — NORTON ROSE FULBRIGHT US LLP; Gerard A. Messina

(57) ABSTRACT

Wheel brakes of one vehicle axle of a dual-circuit hydraulic-power vehicle brake system for an electric or hybrid vehicle are connected to one brake circuit. Brake pressure is applied by a power brake-pressure generator to the two brake circuits with a time offset. It is thereby possible to compensate for a deceleration effect of an electric motor of the vehicle, which is operated as a generator during a braking.

15 Claims, 1 Drawing Sheet

(56) References Cited

U.S. PATENT DOCUMENTS

| | | | |
|---|---|---|---|
| 2018/0126971 A1* | 5/2018 | Leiber | B60T 8/326 |
| 2018/0162339 A1* | 6/2018 | Irwan | B60T 8/00 |
| 2018/0162340 A1* | 6/2018 | Irwan | B60T 8/90 |
| 2019/0322261 A1* | 10/2019 | Hienz | B60T 13/686 |
| 2020/0172074 A1* | 6/2020 | Krautter | B60T 13/66 |
| 2021/0146899 A1* | 5/2021 | Bayer | B60T 13/745 |

* cited by examiner

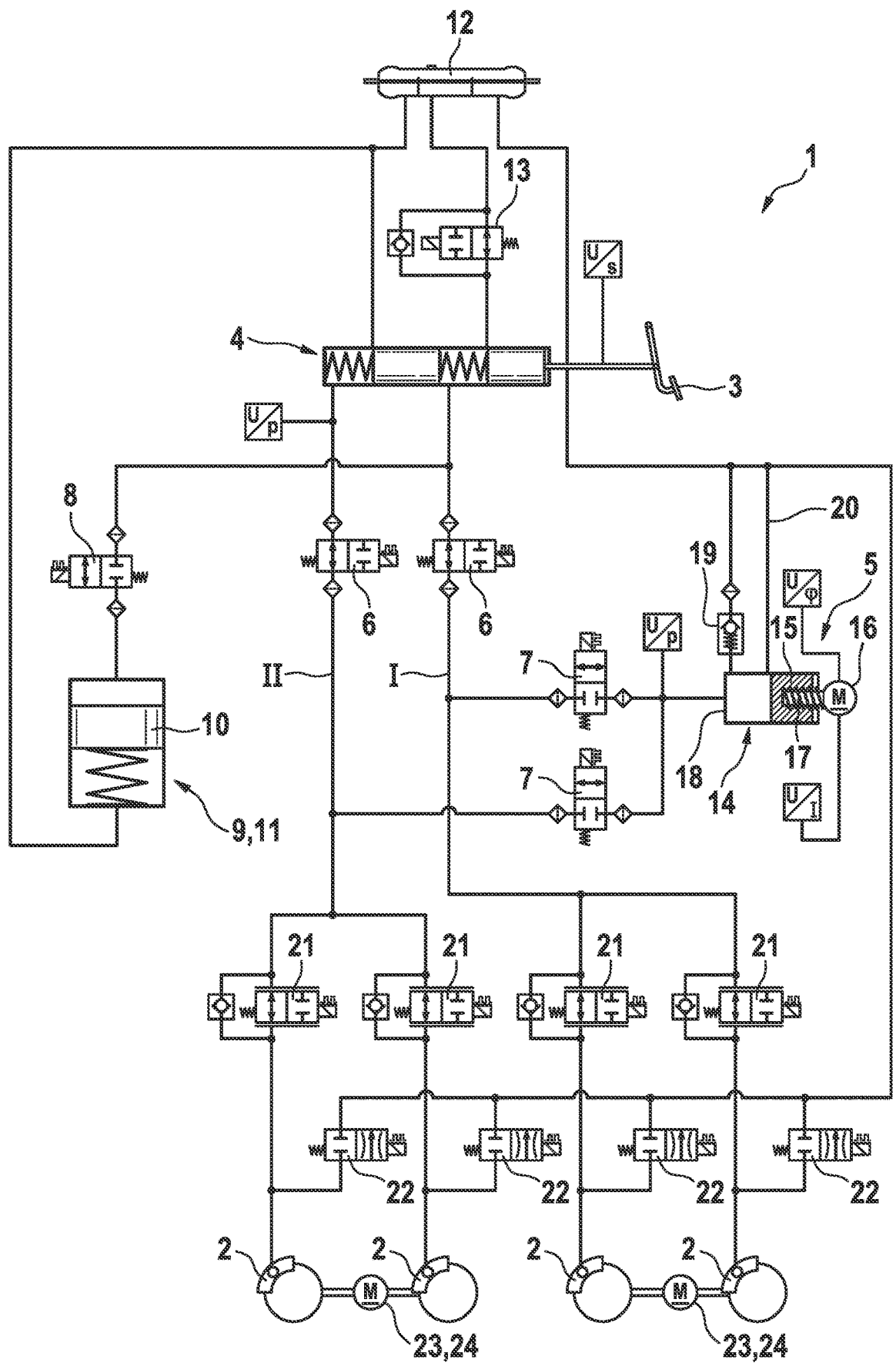

SERVICE BRAKE APPLICATION UTILIZING A MULTI-CIRCUIT HYDRAULIC-POWER VEHICLE BRAKE SYSTEM

CROSS REFERENCE

The present application claims the benefit under 35 U.S.C. § 119 of German Patent Application No. DE 102020212413.2 filed on Sep. 30, 2020, which is expressly incorporated herein by reference in its entirety.

FIELD

The present invention relates to a service brake application utilizing a multi-circuit hydraulic-power vehicle brake system, that is, actuation of wheel brakes of the multi-circuit hydraulic-power vehicle brake system by generating a hydraulic brake pressure using non-muscular energy. The service brake application is the provided actuation of the vehicle brake system, more specifically, its wheel brakes. Other brake actuations are possible.

BACKGROUND INFORMATION

The International Patent Application No. WO 2012/150 120 A1 describes a dual-circuit hydraulic-power vehicle brake system having an electrohydraulic power brake-pressure generator which has a piston/cylinder unit whose piston is displaceable in a cylinder by an electric motor via a screw drive in order to generate a brake pressure. Hydraulic wheel brakes are connected to the power brake-pressure generator, or rather, to its cylinder, via one power valve for each brake circuit and one inlet valve for each wheel brake. The wheel brakes are connected to an unpressurized brake-fluid reservoir via one outlet valve each. Wheel-brake pressures may be controlled separately in each wheel brake utilizing the inlet valves and the outlet valves. For a secondary braking in the event the power brake-pressure generator fails, the conventional vehicle brake system has a brake master cylinder operable by muscular energy, which during a service brake application, is disconnected hydraulically from the brake circuits by the closing of isolating valves. The brake master cylinder is used as setpoint generator for the brake pressure during a service brake application.

SUMMARY

A vehicle brake system for carrying out the service brake application according to an example embodiment of the present invention takes the form of a multi-circuit hydraulic-power vehicle brake system. It has a power brake-pressure generator, to which two or more brake circuits are connected by way of one power valve per brake circuit, each of the brake circuits having one or more hydraulic wheel brakes. Each wheel brake is connected to the respective brake circuit by an inlet valve, and each wheel brake has an outlet valve, by which a wheel-brake pressure is able to be reduced. The wheel-brake pressure is the brake pressure in a wheel brake. For example, the outlet valves connect the wheel brakes to one or more hydraulic accumulators or to one or more unpressurized brake-fluid reservoirs, so that by opening an outlet valve, the wheel-brake pressure in the associated wheel brake is able to be reduced.

For instance, the power brake-pressure generator may have a piston/cylinder unit whose piston is displaceable in a cylinder of the piston/cylinder unit with the aid of an electric motor via a screw drive, in order to generate the brake pressure. Another possibility is an hydraulic pump as power brake-pressure generator, able to be driven by an electric motor. The list is by way of example and not final. For the service brake application in accordance with an example embodiment of the present invention, the power brake-pressure generator generates a brake-circuit pressure in one brake circuit which, by way of the open inlet valves and with the outlet valves closed, applies a brake pressure—the brake-circuit pressure—to the wheel brakes of this brake circuit, and in this way actuates them. The power valve of the brake circuit acted upon by the pressure is in the open state or is opened, the power valve(s) of other brake circuits are in the closed state or are closed. The brake-circuit pressure is the hydraulic pressure or brake pressure that prevails in a brake circuit.

The brake-circuit pressure may also be generated by the power brake-pressure generator in several brake circuits together. It is also possible to at first generate a brake-circuit pressure in all or in several brake circuits together using the power brake-pressure generator, and upon reaching a certain brake-circuit pressure, to further increase the brake-circuit pressure in one or more brake circuits using the power brake-pressure generator and to disconnect the other brake circuit(s) from the power brake-pressure generator by closing their power valves, so that their brake-circuit pressures will not further increase.

The other brake circuit(s) may be pressureless and their wheel brakes are not actuated, or they are acted upon by pressure and their wheel brakes are actuated. While pressure is being generated by the power brake-pressure generator in one or more brake circuits, the brake-circuit pressure in the other brake circuit(s) whose power valves are closed cannot be changed by the power brake-pressure generator. It is possible to reduce the brake-circuit pressure or wheel-brake pressures in the other brake circuit(s) by opening the outlet valves of the wheel brakes, and thereby decreasing a braking force of the wheel brakes.

Further developments and advantageous refinements of the present invention are disclosed herein.

The brake-circuit pressures may be reduced in each brake circuit independently of each other with the inlet valve open, by opening the outlet valve of at least one wheel brake connected to the particular intended brake circuit. An example embodiment of the present invention provides for lowering the brake-circuit pressure in one or more brake circuits using the power brake-pressure generator, for which purpose the power valve of the particular intended brake circuit(s) is in the open state or is opened and the power valves of the other brake circuit(s) are in the closed state or are closed. The brake-circuit pressure may be increased, held constant and reduced by the power brake-pressure generator.

According to the present invention, the brake-circuit pressures in the brake circuits are generated, increased, held constant and/or reduced by the power brake-pressure generator with a time offset. Brake circuits with identical brake-circuit pressures may be acted upon together with the brake pressure by the power brake-pressure generator.

If the vehicle brake system has a brake master cylinder operable by muscular energy, it is disconnected hydraulically from the brake circuits during the service brake application of the present invention described above, preferably by the closing of isolating valves.

An example embodiment of the present invention provides that wheel brakes of one vehicle axle are connected to one brake circuit, so that the same brake-circuit pressure is applied to them. By closing the inlet valve and opening the outlet valve of one or more wheel brakes of the brake circuit, their wheel-brake pressure may be dropped below the brake-circuit pressure. For example, a slip control is possible utilizing the inlet valves and the outlet valves.

The service brake application according to the present invention is provided particularly for an electric vehicle or a hybrid vehicle, whose electric motor or electric motors is/are operated as a generator to decelerate the vehicle. A braking force of the vehicle brake system is decreased commensurate with a deceleration effect of the electric motor operated as generator. The braking forces of the wheel brakes may be reduced whose vehicle wheels are driven by the electric motor or electric motors to propel the vehicle and which, upon deceleration of the vehicle, drive the electric motor operated as generator. The vehicle may also have one or more generators driven by one or more vehicle wheels. Generally speaking, it may be a rotating electric machine that may be an electric motor operated as a generator to decelerate the vehicle, or may be a generator.

All features disclosed in the specification and the FIGURES may be realized individually or in basically any combination in specific embodiments of the present invention. Realizations of the present invention which do not have all, but rather only one or more features of a specific embodiment of the present invention, are possible.

The present invention is explained in greater detail below on the basis of a specific embodiment shown in the FIGURE.

BRIEF DESCRIPTION OF THE DRAWING

The single FIGURE shows a hydraulic circuit diagram of a multi-circuit hydraulic-power vehicle brake system for carrying out the service brake application according to an example embodiment of the present invention.

DETAILED DESCRIPTION OF EXAMPLE EMBODIMENTS

The FIGURE shows a multi-circuit, namely, a dual-circuit hydraulic-power vehicle brake system 1 having two brake circuits I, II with two hydraulic wheel brakes 2 each. Vehicle brake system 1 has a dual-circuit brake master cylinder 4 operable with muscular energy utilizing a foot-brake pedal 3, and a power brake-pressure generator 5. The two brake circuits I, II are connected hydraulically in parallel to brake master cylinder 4 and to power brake-pressure generator 5, each brake circuit I, II being connected by one isolating valve 6 each to brake master cylinder 4, and by one power valve 7 each to power brake-pressure generator 5.

In one of the two brake circuits I, a piston/cylinder unit 9 having a spring-loaded piston 10 is connected as pedal-travel simulator 11 by way of a simulator valve 8 to one chamber of dual-circuit brake master cylinder 4.

Brake master cylinder 4 has an unpressurized brake-fluid reservoir 12 having three chambers, the two brake circuits I, II of brake master cylinder 4 being connected to two of the three chambers of brake-fluid reservoir 12. One of the two chambers of brake master cylinder 4 is connected to brake-fluid reservoir 12 via a test valve 13, and the other chamber is connected directly to brake-fluid reservoir 12.

Power brake-pressure generator 5 has a piston/cylinder unit 14 whose piston 15 is displaceable in a cylinder 18 of piston/cylinder unit 14 by non-muscular energy utilizing an electric motor 16 via a screw drive 17 in order to generate a brake pressure. The two brake circuits I, II of vehicle brake system 1 are connected to cylinder 18 of power brake-pressure generator 5 via the two power valves 7.

Cylinder 18 of piston/cylinder unit 14 of power brake-pressure generator 5 is connected via a non-return valve 19, traversable in the direction of cylinder 18, to one of the three chambers of brake-fluid reservoir 12, and specifically the chamber to which brake master cylinder 4 is not connected. In addition, cylinder 18 of piston/cylinder unit 14 of power brake-pressure generator 5 is connected directly to brake-fluid reservoir 12 by a brake line 20 without interposition of a valve. At the beginning of its displacement, piston 15 of power brake-pressure generator 5 passes over an outlet of this brake line 20 into cylinder 18 of piston/cylinder unit 14, so that during actuation of power brake-pressure generator 5, piston/cylinder unit 14 of power brake-pressure generator 5 is disconnected hydraulically from brake-fluid reservoir 12.

Each wheel brake 2 is connected via an inlet valve 21 to one of the two brake circuits I, II, and via an outlet valve 22 to unpressurized brake-fluid reservoir 12.

In the specific embodiment of the invention shown and described, isolating valves 6, power valves 7, simulator valve 8, test valve 13, inlet valves 21 and outlet valves 22 are 2/2-way solenoid valves, isolating valves 6, test valve 13 and inlet valves 21 being open in their currentless normal positions, and power valves 7, simulator valve 8 and outlet valves 22 being closed in their currentless normal positions. For better controllability of wheel-brake pressures in wheel brakes 2, in the specific embodiment of the invention illustrated and described, inlet valves 21 are continuously operated valves, and the other valves 6, 7, 8, 13, 22 are simpler switching valves. The invention does not rule out other types of valves. Continuously operated valves feature a continuous transition between a closed and an open position and vice versa, whereas switching valves have only the two switching positions, open and closed. Continuously operated valves may also be regarded as throttle valves having a controllable through-flow cross-section or controllable flow resistance.

Wheel brakes 2 of one vehicle axle are connected in each case to the same brake circuit I, II.

Vehicle brake system 1 is provided for an electric vehicle or a hybrid vehicle, thus, for a vehicle which has one or more electric motors 23 for its drive. A hybrid vehicle has a further drive, e.g., a combustion engine. The vehicle may have electric motors 23 for single, several or all vehicle wheels. In the drawing, an electric motor 23 is shown for vehicle wheels of each vehicle axle.

A service brake application according to the invention is carried out as a power braking utilizing power brake-pressure generator 5. To that end, a brake pressure is generated by power brake-pressure generator 5, and by opening a power valve 7, the brake pressure of power brake-pressure generator 5 is applied to one brake circuit, e.g., brake circuit I. The brake pressure prevailing in brake circuit I is also referred to as brake-circuit pressure. Inlet valves 21 remain open and outlet valves 22 remain closed, so that the brake-circuit pressure is applied to wheel brakes 2 connected to the one brake circuit I and are thus actuated. The brake pressure prevailing in wheel brakes 2 is also referred to as wheel-brake pressure. The brake-circuit pressure and the wheel-brake pressures may be increased or decreased by a forward or backward displacement of piston 15 in cylinder 18 of piston/cylinder unit 14 of power brake-pressure generator 5, the brake-circuit pressure and the wheel-brake pressures remaining constant when piston 15 is motionless.

In the other brake circuit II, the brake-circuit pressure is generated, increased, reduced or held constant by power brake-pressure generator 5 in the same manner with a time offset. The brake-circuit pressures in brake circuits I, II are thus generated, increased, reduced or held constant by power brake-pressure generator 5 with a time offset. It is also possible to initially generate the brake-circuit pressures in the two brake circuits I, II simultaneously, and only then to increase, reduce or keep the brake-circuit pressures constant in brake circuits I, II with a time offset.

To decelerate the vehicle, electric motors 23 are operated as generators to generate electrical energy. Therefore, they may also be regarded generally as rotating electric machines 24. Braking forces of wheel brakes 2 are decreased commensurate with a deceleration effect of electric motors 23 in generator operation, that is, lower brake-circuit pressures are generated than would be necessary without the deceleration effect of electric motors 23 in generator operation. Since the vehicle wheels of one vehicle axle are drive-connected to one electric motor 23 and their wheel brakes 2 are connected to the same brake circuit I, II, it is possible to compensate well for the deceleration effect of electric motors 23 in generator operation.

During the service brake application, brake master cylinder 4 is disconnected hydraulically from brake circuits I, II by closing isolating valves 6. Brake master cylinder 4 is used as setpoint generator for the brake-circuit pressures to be generated by power brake-pressure generator 5, which may be different in the two brake circuits I, II. Simulator valve 8 is opened during the service brake application, so that brake master cylinder 4 is able to displace brake fluid into pedal-travel simulator 11, and a piston travel and a pedal travel are possible at brake master cylinder 4.

In the event power brake-pressure generator 5 malfunctions or fails, a secondary braking is possible by actuating brake master cylinder 4 using muscular energy, in doing so, isolating valves 6 remaining open and power valves 7 remaining closed.

Inlet valves 21 and outlet valves 22 form wheel-brake pressure-control valve assemblies by which a wheel-specific control of the wheel-brake pressure is possible individually in each wheel brake 2 of vehicle brake system 1. A slip control is thereby possible. Such slip controls include antilock braking systems, traction control systems and vehicle dynamics controls or electronic stability programs, the latter also commonly being referred to as anti-slip control systems. The abbreviations ABS, TCS and VDC or ESP are customary for these slip controls. Such slip controls are familiar and are not explained in greater detail here. An axle-wise slip control by power brake-pressure generator 5 is also possible.

By closing inlet valve 21 and opening outlet valve 22 of a wheel brake 2, the wheel-brake pressure in this wheel brake 2 may be dropped below the brake-circuit pressure of the brake circuit I, II to which this wheel brake 2 is connected.

During the service brake application according to the present invention, inlet valves 21 of the brake circuit I, II which is disconnected hydraulically from power brake-pressure generator 5 by closure of its power valve 7, may be closed in order to avoid an increase in the wheel-brake pressures in wheel brakes 2 of this brake circuit I, II in the event closed power valve 7 does not close absolutely imperviously.

What is claimed is:

1. A method of service braking utilizing a multi-circuit hydraulic-power vehicle brake system, the vehicle brake system including (a) a first brake circuit, (b) a second brake circuit, (c) a power brake-pressure generator connected to the first brake circuit via a first power valve and connected to the second brake circuit via a second power valve, (d) a first one or more hydraulic wheel brakes each connected by a respective first-circuit inlet valve to the first brake circuit, (e) a second one or more hydraulic wheel brakes each connected by a respective second-circuit inlet valve to the second brake circuit, and (f) for each of the hydraulic wheel brakes, a respective outlet valve by opening of which wheel-brake pressure in the respective hydraulic wheel brake is reducible, the method comprising:
   generating a brake-circuit pressure in the first brake circuit by the power brake-pressure generator opening the first power valve in a period in which:
   the second power valve is closed; and
   the outlet valves of each of the hydraulic wheel brakes connected to the first brake circuit and connected to the second brake circuit are all closed.

2. The method of service braking as recited in claim 1, wherein the brake-pressure generator performs a brake-circuit pressure increase by performing a sequential activation of the first and second brake circuits that includes a start of the generating of the brake-circuit pressure followed by a start of a generation of brake-circuit pressure in the second brake circuit with a time offset.

3. The method of service braking as recited in claim 1, wherein: (i) the inlet valves are continuously operated valves that gradually transition between open and closed, and (ii) the outlet valves and/or the power valves are switching valves that abruptly switch between open and closed states.

4. The method of service braking as recited in claim 1, wherein the vehicle brake system has a brake master cylinder, operable by muscular energy, for a secondary braking, to which the brake circuits are connected by one isolating valve each, the isolating valves being closed during the service braking.

5. The method of service braking as recited in claim 1, wherein all of the first one or more hydraulic wheel brakes are connected to a same first vehicle axle, and all of the second one or more hydraulic wheel brakes are connected to a same second vehicle axle.

6. The method of service braking as recited in claim 4, wherein:
   the isolating valves are configured so that they are open in a currentless state of the brake system and closed in a current-application state of the brake system; and
   the first and second power valves are configured so that they are closed in the currentless state and open in the current-application state.

7. The method of service braking as recited in claim 6, wherein the outlet valves are configured so that they are closed in a currentless state and open in a current-application state.

8. The method of service braking as recited in claim 4, wherein the brake-pressure generator performs a brake-circuit pressure increase by performing a sequential activation of the first and second brake circuits that includes a start of the generating of the brake-circuit pressure followed by a start of a generation of brake-circuit pressure in the second brake circuit with a time offset.

9. The method of service braking as recited in claim 1, wherein at least one of the hydraulic wheel brakes controls a braking of a wheel that drives a rotating electric machine which is operated as a generator to decelerate the vehicle.

10. A vehicle braking system comprising:
    a first brake circuit;

a second brake circuit;
a power brake-pressure generator connected to the first brake circuit via a first power valve and connected to the second brake circuit via a second power valve;
a first one or more hydraulic wheel brakes each connected by a respective first-circuit inlet valve to the first brake circuit;
a second one or more hydraulic wheel brakes each connected by a respective second-circuit inlet valve to the second brake circuit; and
for each of the hydraulic wheel brakes, a respective outlet valve by opening of which wheel-brake pressure in the respective hydraulic wheel brake is reducible;
wherein the vehicle braking system includes at least one of the following two features (a)-(b):
 (a) the braking system is configured to generate a brake-circuit pressure in the first brake circuit by the power brake-pressure generator opening the first power valve in a period in which:
  the second power valve is closed; and
  the outlet valves of each of the hydraulic wheel brakes connected to the first brake circuit and connected to the second brake circuit are all closed; and
 (b) (I) the braking system further comprises a master cylinder (i) that is operable by muscular energy for a secondary braking, (ii) to which the first brake circuit is connected via a first isolating valve, and (iii) to which the second brake circuit is connected via a second isolating valve, (II) the isolating valves are configured so that they are open in a currentless state of the brake system and closed in a current-application state of the brake system, and (III) the first and second power valves are configured so that they are closed in the currentless state and open in the current-application state.

11. The vehicle braking system as recited in claim 10, wherein the braking system is configured to generate the brake-circuit pressure in the first brake circuit by the power brake-pressure generator opening the first power valve in the period in which:
the second power valve is closed; and
the outlet valves of each of the hydraulic wheel brakes connected to the first brake circuit and connected to the second brake circuit are all closed.

12. The vehicle braking system as recited in claim 10, wherein:
the braking system further comprises the master cylinder (i) that is operable by muscular energy for the secondary braking, (ii) to which the first brake circuit is connected via the first isolating valve, and (iii) to which the second brake circuit is connected via the second isolating valve;
the isolating valves are configured so that they are open in the currentless state of the brake system and closed in the current-application state of the brake system; and
the first and second power valves are configured so that they are closed in the currentless state and open in the current-application state.

13. A method of service braking utilizing a multi-circuit hydraulic-power vehicle brake system, the vehicle brake system including (a) a master brake cylinder, (b) a first brake circuit, (c) a second brake circuit, (d) a power brake-pressure generator connected to the first brake circuit via a first power valve and connected to the second brake circuit via a second power valve, (e) a first one or more hydraulic wheel brakes each connected by a respective first-circuit inlet valve to the first brake circuit, and (f) a second one or more hydraulic wheel brakes each connected by a respective second-circuit inlet valve to the second brake circuit, the method comprising:
generating a brake-circuit pressure in the first brake circuit by the power brake-pressure generator opening the first power valve in a period in which:
 the second power valve is closed; and
 all fluid connections between (I) the master brake cylinder and (II) the first and second brake circuits are closed.

14. The method of service braking as recited in claim 13, wherein:
the vehicle brake system further includes, for each of the hydraulic wheel brakes, a respective outlet valve by opening of which wheel-brake pressure in the respective hydraulic wheel brake is reducible; and
in the period in which the generating of the brake-circuit pressure in the first brake circuit by the power brake-pressure generator opening the first power valve is performed, the outlet valves of each of the hydraulic wheel brakes connected to the first brake circuit are all closed.

15. The method of service braking as recited in claim 14, wherein, in the period in which the generating of the brake-circuit pressure in the first brake circuit by the power brake-pressure generator takes place, the outlet valves of each of the hydraulic wheel brakes connected to the second brake circuit are also all closed.

* * * * *